Figure 1:
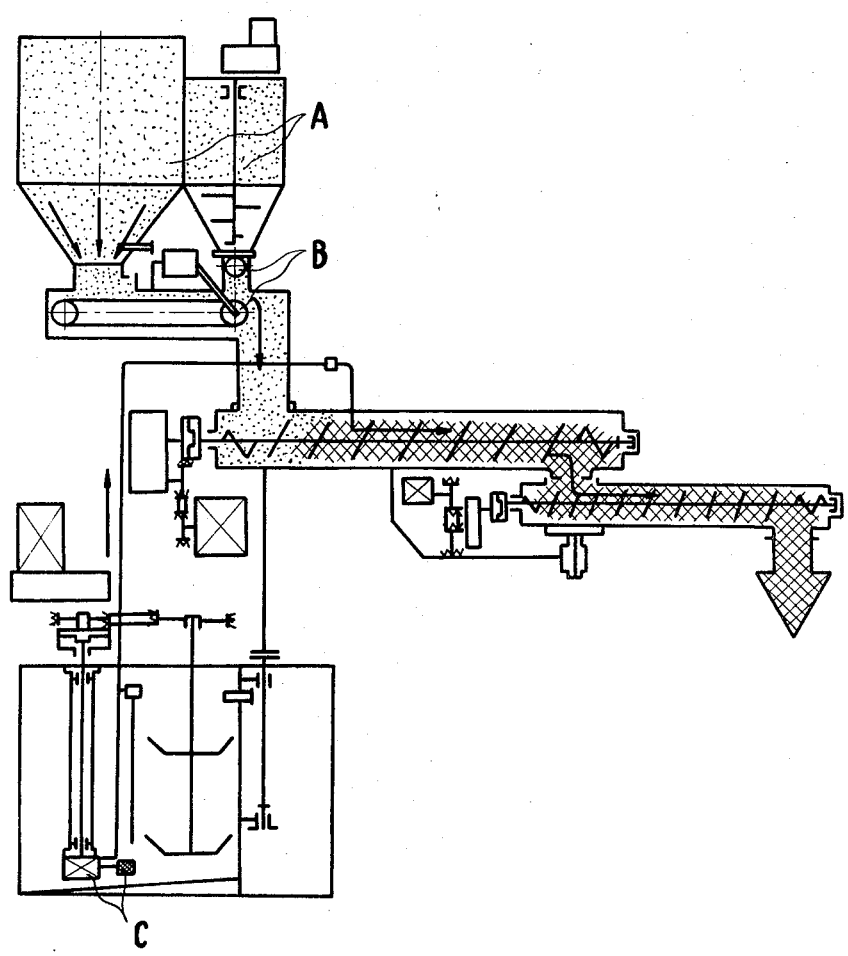

United States Patent
Kedzior et al.

[15] 3,682,448
[45] Aug. 8, 1972

[54] METHOD OF CONTINUOUS AND CONTROLLED PREPARATION OF THE LIQUID SELF-HARDENING MOULDING SAND AND THE INSTALLATION FOR ITS APPLICATION

[72] Inventors: Andrzej Kedzior, Wroclawska Str. 52b; Jan Horoszko, Wroclawska Str. 62; Tadeusz Olszowski, Nollo Str. 15; Edward Romaniec, Kepna Str. 19; Stanislaw Zaremba, Przomyska Str. 4, all of Krakow, Poland

[22] Filed: Nov. 5, 1969

[21] Appl. No.: 874,314

[30] Foreign Application Priority Data
Nov. 7, 1968 Poland..................P. 129944

[52] U.S. Cl..................................259/148, 259/165
[51] Int. Cl..............................................B28c 7/04
[58] Field of Search......259/154, 165, 164, 168, 161, 259/162, 163, 18, 23, 24, 25, 26, 148, 146, 147

[56] References Cited

UNITED STATES PATENTS

| | | | |
|---|---|---|---|
| 3,336,011 | 8/1967 | Futty | 259/168 |
| 3,129,928 | 4/1964 | Huntington | 259/165 |
| 3,249,970 | 5/1966 | Hartley | 259/154 |
| 3,430,929 | 3/1969 | Kawecki | 259/165 |

*Primary Examiner*—Robert W. Jenkins
*Attorney*—Irvin A. Lavine

[57] ABSTRACT

Method and apparatus for the continuous preparation and delivery of self hardening liquid containing foundry sand in which granular components are stored in hoppers and a liquid component is stored in a tank. The components are withdrawn by feeders and a pump, each powered by a separate variable speed electric motor connected to a source through a separate rheostat. The components are mixed in a mixer, and are continuously delivered from the mixer to a distributor; the mixer is rotatably mounted on the base of the apparatus and the distributor is rotatably mounted at the outlet of the mixer, and has a control panel at its outlet.

13 Claims, 5 Drawing Figures

METHOD OF CONTINUOUS AND CONTROLLED PREPARATION OF THE LIQUID SELF-HARDENING MOULDING SAND AND THE INSTALLATION FOR ITS APPLICATION

According to the heretofore known methods of preparation of self-hardening liquid containing molding sand by either batch or continuous process, no control was provided. 12 The present known methods of preparation of self-hardening liquid containing molding sand have the disadvantage of lengthy mold or core preparation cycle; moreover, difficulty exists in obtaining the homogenuous sand which is necessary to make molds and cores of greater volume than that of a single charge. Lack of continuous control of the sand composition in present methods, precludes their adaptation to the demands of the technology of mold and core fabrication moreover it precludes the right choice of the appropriate mixture, depending on properties and quality of the initial components.

Besides, present known methods do ensure the proper adaptation of the quality of the sand prepared to the volume of molds and cores in question, which causes production losses as well as disturbances in the proper flow of the technological process.

Another disadvantage of installations for the application of these methods lies in the necessity for individual hand-control of the separate feeding assemblies in case of a requirement for changes in the sand composition and capacity; this causes many difficulties to operators of installations, and results in variations of the technological properties of the liquid containing sand in preparation; in consequence an inferior quality of produced castings occurs, thus increasing rejects.

Feeding assemblies in existing apparatus for preparation of liquid containing sands, have used different kinds of feeders, for instance f.l. electric and pneumatic feeders, as well as different kinds of component measuring apparatus, for instance f.l. voluminal and weighing apparatus. This does not permit simultaneous and continuous control of the feeders, thus preventing continuous and stepless control of both composition and quality of the sand in preparation.

Installations presently known have their parts fixed to the base and because of the immobility of the outlet gate, the proper spreading of the liquid containing sand over the whole surface of the moulding or core-box is impossible. Providing experimentally a movable chute was no solution of the problem. Further disadvantages of presently used apparatus are their heavy, uncompact and ugly design, necessity of substantial electric power supply, and the large foundation surface required.

To reduce all these inconveniences and disadvantages, a method and apparatus have been provided which permit in a continuous way fabrication of self hardening liquid containing moulding sand, providing a stepless control of the quality of individual components, as well as the quantity of the liquid containing sand, thus ensuring utilization of these quantities for making moulds and cores of different sizes, from minimum to maximum without losses of the sand, which further would enable quick, efficient and faultless preparation of the liquid containing sand and its quick and uniform spreading. To increase universality and to obtain better technical performance and economic operation of process for preparing self-hardening liquid containing moulding sand, there has been provided control of the hardening time, i.e., of control of the speed of the process.

The present invention apparatus and method have come about as a result of keen analysis and experiments, providing an installation having variable speed of its individual feeding assemblies i.e., of feeders of granular and liquid components with individual drives for each feeder, the former being individually and steplessly controlled and interlocked in a control system providing stepless control with remote automatic actuation. A universal coupling is provided for a two membered mixing assembly with individual drives.

According to the method of this invention, preparation of the selfhardening liquid containing sand occurs in a continuous way as a result of the proportional and continuous supply to the mixing assembly of loose granular and liquid components by the feeding assemblies as well as by mixing of these components while being transported thus ensuring the required properties of the sand.

The apparatus of this invention ensures the required accuracy of voluminal feeding of the sand components, their correct mixing and frothing, and uniform spreading of the sand over the whole moulding area. It ensures also a stepless control of the sand composition indication of the components fed, a stepless automatically coupled control of capacity when "off" or "in" work and indication of quantity of the sand prepared. It may be operated as well by individual control as by automatic cycling.

The said installation enables preparation of the self-hardening liquid containing sand from three basic granular components, and the four-components sand has a controlled time for proper bonding, causing no disturbancies in the process. The installation for liquid containing sand preparation is simple, easy to construct, and reliable in performance.

Correctness of functioning of the continuous method of the controlled liquid containing sand preparation, and the proper functioning of the installation are continuously checked by means of an indicative system, the reliability of which is tested on a pilot unit. The method of continuous and controlled liquid containing sand preparation and installation for this purpose, may be widely used in the foundry industry, because of its technical and economic advantages.

Figure 2:
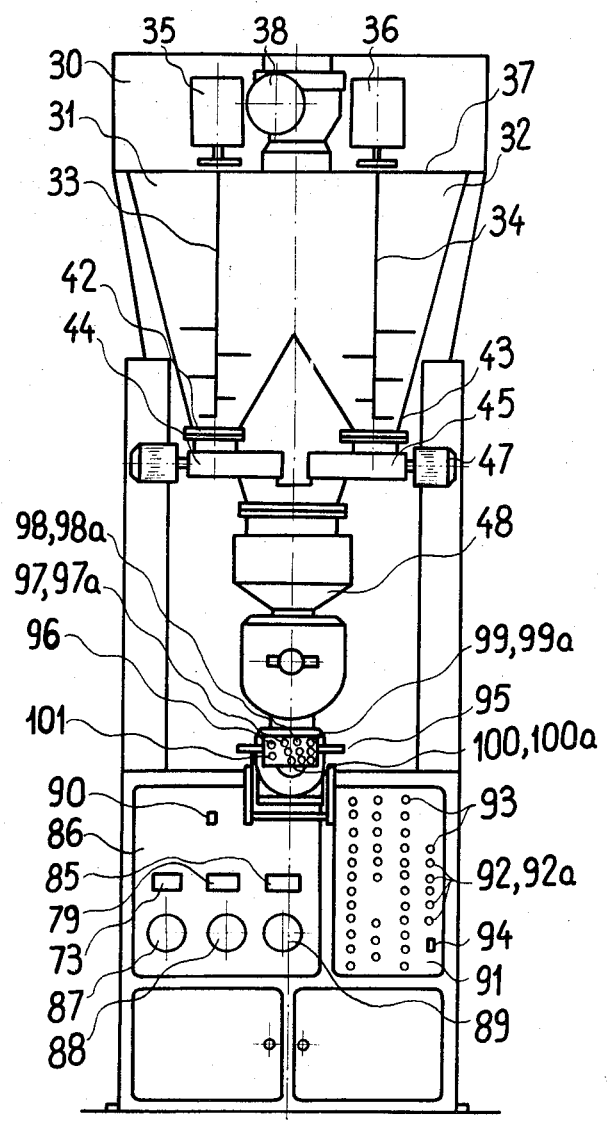
Figure 3:
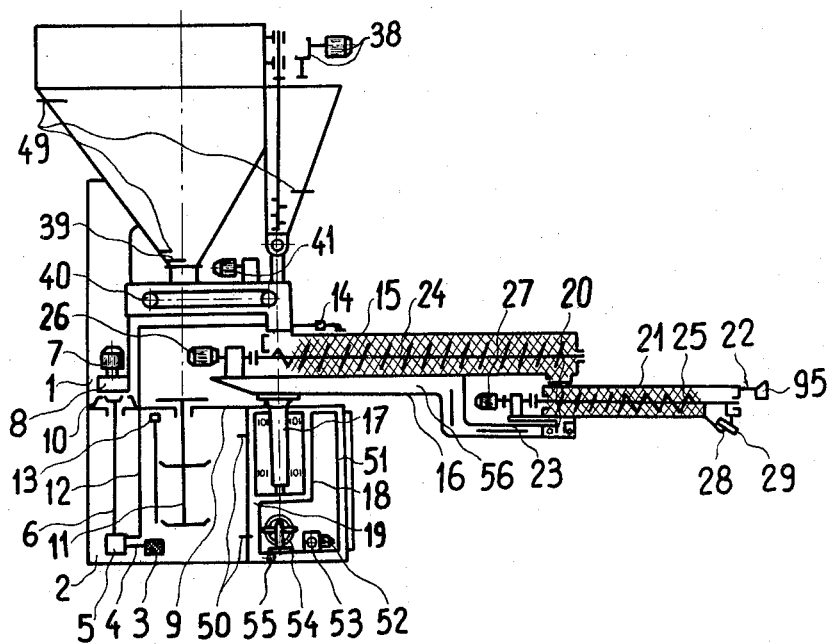
Figure 4:
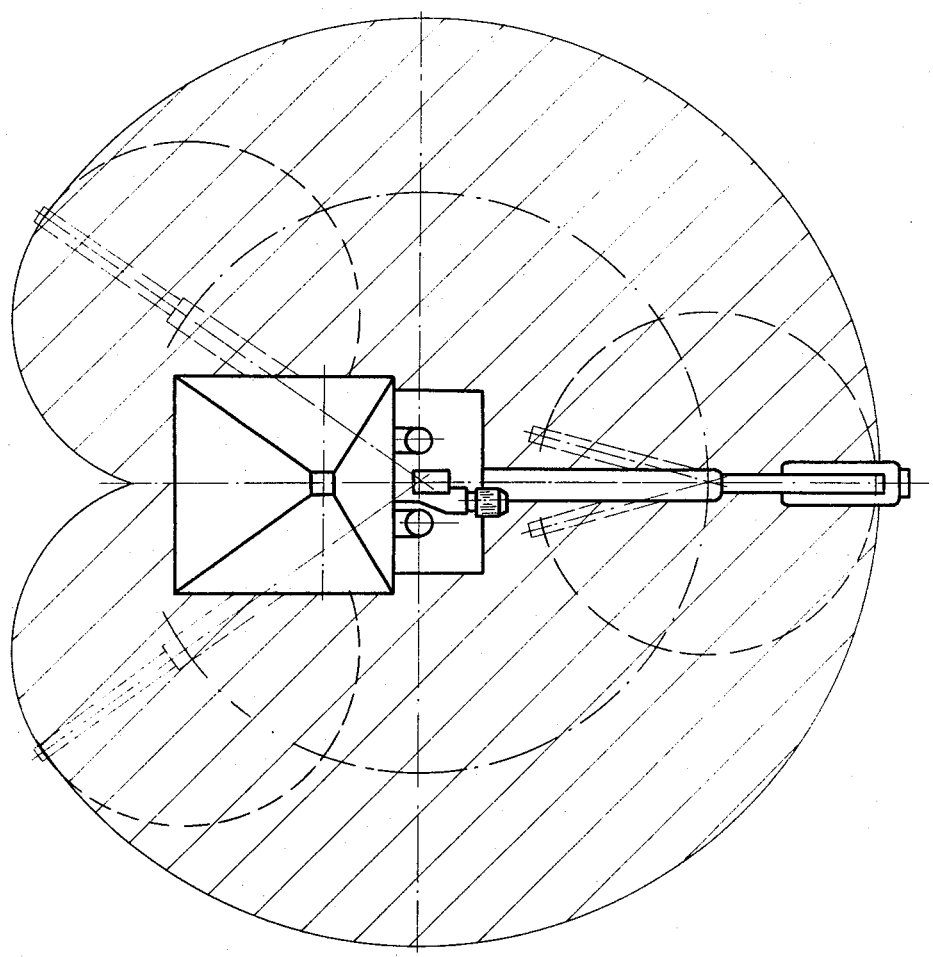
Figure 5:
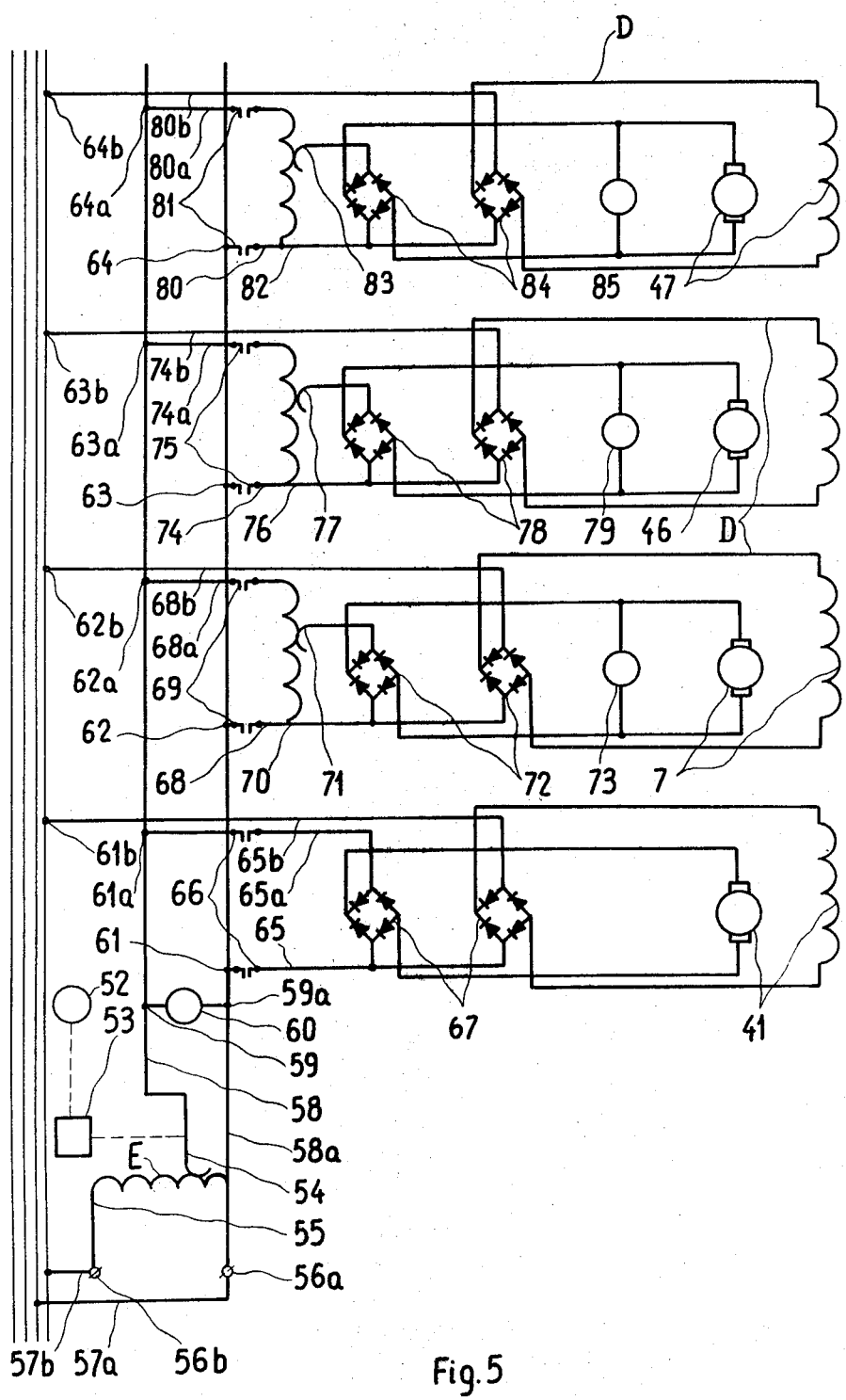

The method and apparatus in accordance with the invention are shown, by way of example, in the attached drawings wherein FIG. 1 shows schematically apparatus for controlled preparation of selfhardening moulding sands FIG. 2 shows an elevational view of installation, FIG. 3 shows a schematic view transverse to FIG. 2, FIG. 4. shows a top view of the installation with area of coverage indicated FIG. 5 is a circuit diagram.

In FIG. 1 there is schematically shown an apparatus in accordance with the present invention. The apparatus includes grannular material hoppers A, the granular material being continuously delivered to a mixer by controlled feeders B. A liquid component is delivered to the mixer by pump and filter C.

Referring to FIG. 3, in the bottom part of the frame 1 made of laminated steel profiles and sheets, or any other convenient material a liquid components tank 2 is situated in which a filter 3 is incorporated, connected by duct 4 to the pump 5 driven by the shaft 6 of an electric motor 7 through the reducer 8. The motor 7 and reducer 8 are carried on the cover 9.

Motor 7 is also connected through the reducer 8 and the reducer 10 to the stirrer 11 rotating on bearings fixed in the cover 9. Feeding pump 5 is connected through the piping 12 having overflow valve 13 and cut-off valve 14 to the mixer 15 positioned on the support 16 fixed to the rotary column 17 carried on bearings in the housing 18 fixed to the front wall 19 of the tank 2. On the support 16 of the mixer 15 carried on bearings is a rotary base 20 of the distributor 21, a grip 22 being fixed to the frame of the latter and a grip 23 to the support 16. In the housing of the mixer 15 a rotative shaft 24 is carried on bearings and in the housing of distributor 21 the shaft 25 is similarly supported, both shafts 24 and 25 having convenient individual electric drives 26 and 27. The housing of the distributor 21 has on its end an outlet 28 with a diaphragm 29 for controlling the discharge to prevent spillage when shifting from one position to another.

To the upper arms of the frame 1 are mounted, as shown in FIG. 2, filling component hopper 30, hardening component hopper 31 and activating component hopper 32, stirring devices 33 and 34 being positioned in the hoppers 31 and 32, and rotatably supported in housings 35 and 36 mounted on the hopper 30 ; on the cover 37 of hoppers 31 and 32 electrical drive 38 of stirrers 33 and 34 is situated.

Hopper 30 as shown in FIG. 3 has in its bottom part a gate 39, the outlet of the hopper being above the belt feeder 40 with its drive motor 41 ; hoppers 31 and 32 (see FIG. 2) have similar gates 42 and 43 and their outlets adjacent are adjacent worm-feeders 44 and 45, which are individually driven by electric motors 46 and 47, both feeders discharged through the common chute 48 to the mixer 15.

Hoppers for granular components 30, 31, 32 have built into their walls level indicators 49, and liquid tank 2 level indicators 50. Near the tank 2 in the frame 1 a sliding compartment 51 with control, regulation, measuring and signalling apparatus is situated ; on its base an electric motor 52 is mounted which drives a reversible reducer 53, connected to the slide 54 (see FIG. 5) of the rheostat 55 with two connector 56a and 56b, which are connected by two conductor leads 57a and 57b to the main supply at the site of installation. From the connector 56a and from the slide 54, electric leads 58 and 58a are connected to the connectors 59 and 59a of the meter 60, as well as to the connectors 61 and 61a, 62 and 62a 63 and 63a, 64 and 64a.

From connectors 61,61a, 61b, leads 65, 65a, 65b are connected to the contactors 66 and further, to the rectifying system 67, which also is connected with leads to the d.c. motor 41. From connectors 62, 62a, 62b run leads 68, 68a, 68b to the contactors 69 and further to the connectors of the rheostat 70 with slide 71 and to the rectifying system 72 which is connected with leads to the meter 73 and to the d.c. motor 7.

From clamps 63, 63a, 63b run leads 74, 74a, 74b to contactors 75 and further to the connectors of the rheostat 76 with a slide 77 and to the rectifying system 78, which is connected with leads to the meter 79 and to the d.c. motor 46. From clamps 64, 64a, 64b, run leads 80, 80a, 80b to the contactors 81 and further, to the clamps of the rheostat 82 with the slide 83 and to the rectifying system 84, which is connected with leads to the meter 85 and to the d.c. motor 47.

Meters 73, 79, 85 are placed, as shown in FIG. 2, in the front-wall 86 of the compartment 51 as rheostats 70, 76, 82, and furnished with handwheels 87, 88, 89 connected to the slides 71, 77, 83. In the front-wall 86 there is also a master switch 90 on the front-wall 91. On the other hand, control push-buttons 92, 92a, signal lamps 93 and a reversible switch 94 are situated.

In the control box 95 (see FIGS. 2 and 3) screwed to the grip 22, a meter 96 is built, also control push-buttons 97, 97a of the drive 26 of the mixer 15, control push-buttons 98, 98a of the drive 27 of the distributor 21, control push-buttons 99, 99a of the sense of revolutions of the motor 52, control push - buttons 100, 100a when working in interlocked system, and a switch-button 101.

By switching on a master switch 90, the installation is connected to the supply, then with reversible switch 94 an operating mode is choosen i.e., "work in blockade " or " individual start".

Individual start operating mode is completed by switching on convenient control push-buttons 92 to start feeders 40, 44 and 45 and feeding pump 5. The connections made are signaled by convenient signal lamps 93. With hand wheels 87, 88, 89 a required composition of the sand is selected, quantities of components being read on meters 73, 79 85 ; actuating are of the button 99 or 99a controls the motor 52, so that a desired capacity may be choosen, and read on the meter 96. In proper sequence, by means of the button 97 drive 26 of the mixer 15, by button 98 drive 27 of the distributor 21 and, by button 100 the rest of the portions of the installation are actuated, thus beginning the working cycle of the whole installation.

Loose granular components, these in hoppers 30, 31, 32 are measured and supplied by feeders 40, 44, 45 through the chute 48 to the mixer 15 ; together with feeders 44 and 45 stirrers 33 and 34 are working, ensuring correct filling with loose additives of the inlet-chutes of the feeders 44 and 45. Together with loose granular components, liquid components from the tank 2 are measured and supplied by the pump 5 thus consisting a kind of a feeder, drawing the liquid through a filter 3 and a duct 4 ; then through the piping installation the liquid is introduced into the mixer 15, stirrer 11 working together with the pump 5 thus ensuring the correct mixing of the liquid component.

Loose granular and liquid components fed into the mixer 15 are there intensively mixed by means of shaft 24 and delivered to the distributor 21, inside which further mixing occurs.

From the outlet 28 of the distributor 21, the liquid containing sand is deposited at any desired place on the working area shown on FIG. 4, due to the rotary connection of the mixer 15 on the column 17 and that of the distributor 21 on the base 20. Continuous, stepless control of the sand composition i.e., individual control of the quantity of fed components is performed during either stopping of the machinery or work of the installation by means of and wheels 87, 88, 89, the quantity of the components fed being shown on meters 73, 79, 85.

Automatic, stepless control of the quantity of the sand prepared by the present invention installation is remotely accomplished by means of control push buttons 99 and 99a which actuate the motor 52, thus causing through the reducer 53 movement of the slide 54 of the rheostat 55, so that there results a simultaneous and proportional change of the supply voltage and in consequence proportional change in the revolutions of d.c. motors 7, 41, 46, 47, which are the drives of the pump 5 and feeders 40, 44, 45. Thus, the quantity of sand prepared by the installation is controlled and is shown on the meter 93, Instantaneous switching off of the installation is accomplished by pushing the button 101.

Having described the nature of our invention we claim herewith:

1. Apparatus for preparing self hardening sand for use in foundries comprising:
    a plurality of hoppers for granular components,
    means associated with each hopper for feeding component therefrom,
    a tank of liquid component and a pump for removing liquid component from said tank,
    a mixer for receiving components from said hoppers and tank and having an outlet,
    an electric motor for each said feeding means and said pump,
    means for individually and steplessly controlling the speed of some of said feeding means motors and said pump motor,
    and means for steplessly controlling the speed of all said motors simultaneously.

2. The apparatus of claim 1, and a distributor, and means connecting said distributor to said mixer at the outlet thereof for pivotal movement on a vertical axis.

3. The apparatus of claim 2, wherein said apparatus includes a base on which said hoppers and tank are mounted and means connecting said mixer to said base for pivotal movement on a vertical axis.

4. The apparatus of claim 3, wherein each of said mixer and distributor comprises a shaft extending therein, and on electric motor drivingly connected to each said shaft.

5. The apparatus of claim 2, and means positioned on said distributor for operating said control means.

6. The apparatus of claim 1, at least one said hopper having a stirrer therein, and gates at the bottom of each hopper.

7. The apparatus of claim 1, wherein at least one said feeding means is a worm feeder and at least one said feeding means is a belt feeder.

8. The apparatus of claim 1, said tank having a stirrer therein, and means drivingly connecting the pump motor to the stirrer.

9. The apparatus of claim 1, wherein the motors for said feeding means and pump are direct current shunt motors, the means for controlling the speed thereof comprising for each motor rotor a rheostat and rectifying means, and further including means for supplying constant excitation voltage to each motor.

10. The apparatus of claim 1, wherein said means for controlling the speed of all of said motors simultaneously comprises a supply current source and all said motor rotors, and means for supplying excitation voltage to said motors in parallel to said rheostat.

11. The apparatus of claim 1, and further including a level indicator in each said hopper.

12. A method of preparing self hardening sand for use in foundries comprising:
    storing a plurality of granular components in separate hoppers,
    storing a liquid component in a tank,
    continuously delivering controlled quantities of each of said components from said hoppers and tank to a mixer, with the continuous changing of the proportion of one or more of said components,
    mixing said components in said mixer to form a self-hardening liquid containing foundry sand of a desired composition, and,
    continuously removing said sand from said mixer.

13. A method of preparing self hardening sand for use in foundries comprising:
    storing a plurality of granular components in separate hoppers,
    storing a liquid component in a tank,
    continuously delivering controlled quantities of each of said components from said hoppers and tank to a mixer, with varying of the quantities of each component delivered through a period of time,
    mixing said components in said mixer to form a self-hardening liquid containing foundry sand of a desired composition, and,
    continuously removing said sand from said mixer.

* * * * *